(12) United States Patent
Yan et al.

(10) Patent No.: US 11,826,997 B2
(45) Date of Patent: Nov. 28, 2023

(54) FLEXIBLE DISPLAY PANEL

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Hao Yan, Beijing (CN); Yu Zhang, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 432 days.

(21) Appl. No.: 16/491,775

(22) PCT Filed: Mar. 13, 2019

(86) PCT No.: PCT/CN2019/078009
§ 371 (c)(1),
(2) Date: Sep. 6, 2019

(87) PCT Pub. No.: WO2019/228024
PCT Pub. Date: Dec. 5, 2019

(65) Prior Publication Data
US 2021/0331441 A1    Oct. 28, 2021

(30) Foreign Application Priority Data

May 31, 2018   (CN) .......................... 201810550311.3

(51) Int. Cl.
*B32B 3/30*        (2006.01)
*B32B 27/06*       (2006.01)
(Continued)

(52) U.S. Cl.
CPC ............... *B32B 3/30* (2013.01); *B32B 7/12* (2013.01); *B32B 27/06* (2013.01); *B32B 27/36* (2013.01); *B32B 37/12* (2013.01); *B32B 2457/20* (2013.01)

(58) Field of Classification Search
CPC .. B32B 3/30; B32B 7/12; B32B 27/06; B32B 27/36; B32B 37/12; B32B 2457/20
(Continued)

(56) References Cited

U.S. PATENT DOCUMENTS

2006/0273304 A1   12/2006   Cok
2021/0165454 A1*  6/2021    Dong .................... G06F 1/1652

FOREIGN PATENT DOCUMENTS

CN   201435392 Y   3/2010
CN   102437286 A   5/2012
(Continued)

OTHER PUBLICATIONS

Liu (CN 206003771 U); Mar. 8, 2017, (EPO Machine translation to English). (Year: 2017).*
(Continued)

*Primary Examiner* — David Sample
*Assistant Examiner* — Donald M Flores, Jr.
(74) *Attorney, Agent, or Firm* — Armstrong Teasdale LLP (57) ABSTRACT

The present disclosure relates to a flexible display panel. The flexible display panel includes a flexible substrate and a protective film located on the flexible substrate. The protective film includes a plurality of grooves spaced apart from each other. The plurality of grooves includes at least one row of grooves. Positions of the grooves correspond to regions of the flexible substrate where display units are not formed.

18 Claims, 4 Drawing Sheets

(51) Int. Cl.
  *B32B 27/36* (2006.01)
  *B32B 7/12* (2006.01)
  *B32B 37/12* (2006.01)
(58) Field of Classification Search
  USPC ....... 428/131, 136, 156, 158, 159, 163, 167, 428/172, 212, 213
  See application file for complete search history.

(56) References Cited

FOREIGN PATENT DOCUMENTS

| | | | |
|---|---|---|---|
| CN | 203225960 U | | 10/2013 |
| CN | 103367114 B | | 3/2016 |
| CN | 105826350 A | | 8/2016 |
| CN | 106449665 A | | 2/2017 |
| CN | 206003771 | * | 3/2017 |
| CN | 206003771 U | * | 3/2017 |
| CN | 206003771 U | | 3/2017 |
| CN | 206322700 U | | 7/2017 |
| CN | 107180849 A | | 9/2017 |
| CN | 107650484 A | | 2/2018 |
| CN | 108550556 A | | 9/2018 |
| EP | 2908337 A1 | | 8/2015 |
| KR | 1020160144912 A | * | 12/2016 ........... G02F 1/1333 |

OTHER PUBLICATIONS

Kim et al. (KR 10-2016-0144912 A); Dec. 19, 2016, (EPO Machine translation to English). (Year: 2016).*
China Fourth Office Action, Application No. 201810550311.3, dated Oct. 12, 2020, 12 pps.: with English translation.
Fan Zhengxiu, "Optical Thin Films and Use Thereof", 2014, p. 97.: with English translation.
Tang Jinfa et al., "Modern Optical Thin Film Technology", 2006, Chapter 9, 431-433 pps.: with English translation.
PCT International Search Report, Application No. PCT/CN2019/078009, dated Jun. 19, 2019, 5 pages: with English translation.
PCT Written Opinion, Application No. PCT/CN2019/078009, dated Jun. 19, 2019, 5 pages.: with English translation of relevant part.
China First Office Action, Application No. 201810550311.3, dated Aug. 14, 2019, 16 pps.: with English translation.
China Second Office Action, Application No. 201810550311.3, dated Dec. 6, 2019, 13 pps.: with English translation.

* cited by examiner

FLEXIBLE DISPLAY PANEL

CROSS REFERENCE TO RELATED APPLICATIONS

This patent application is a National Stage Entry of PCT/CN2019/078009 filed on Mar. 13, 2019, which claims the benefit and priority of Chinese Patent Application No. 201810550311.3 filed on May 31, 2018, the disclosures of which are incorporated by reference herein in their entirety as part of the present application.

BACKGROUND

Embodiments of the present disclosure relate to a field of displaying technology, in particular, to a flexible display panel.

In the field of displaying technology, flexible displays are applied to a wider range of fields due to their low power consumption, small size, light and thin structure, and deformability.

BRIEF DESCRIPTION

Embodiments of the present disclosure provide a flexible display panel.

A first aspect of the present disclosure provides a flexible display panel. The flexible display panel includes a flexible substrate and a protective film located on the flexible substrate. The protective film includes a plurality of grooves spaced apart from each other. Positions of the grooves correspond to regions of the flexible substrate where display units are not formed.

In an embodiment of the present disclosure, the plurality of grooves include at least one row of grooves.

In an embodiment of the present disclosure, a direction of the row is parallel to a direction extending from a first side of the flexible substrate to a second side of the flexible substrate opposite to the first side.

In an embodiment of the present disclosure, the plurality of grooves further includes at least one column of grooves intersecting the at least one row of grooves.

In an embodiment of the present disclosure, at least one dimension of the groove gradually increases in a direction extending from a first side of the flexible substrate to a second side of the flexible substrate opposite to the first side.

In an embodiment of the present disclosure, a number of the grooves in the protective film gradually increases in a direction extending from a first side of the flexible substrate to a second side of the flexible substrate opposite to the first side.

In an embodiment of the present disclosure, the display units are arranged in an array. The positions of the grooves correspond to regions located between the display units.

In an embodiment of the present disclosure, a shape of the groove includes a rectangle, a circle, or a diamond.

In an embodiment of the present disclosure, a material of the protective film includes polyethylene terephthalate.

In an embodiment of the present disclosure, the protective film is located on a side of the flexible substrate where the display units are not formed.

A second aspect of the present disclosure provides a method for manufacturing a flexible display panel. The method includes providing a flexible substrate, and attaching a protective film to the flexible substrate in a direction extending from a first side of the flexible substrate to a second side of the flexible substrate opposite to the first side, wherein the protective film includes a plurality of grooves spaced apart from each other, and wherein positions of the grooves correspond to regions of the flexible substrate where display units are not formed.

In an embodiment of the present disclosure, the plurality of grooves include at least one row of grooves.

In an embodiment of the present disclosure, a direction of the row is parallel to the direction.

In an embodiment of the present disclosure, the plurality of grooves include at least one column of grooves intersecting the at least one row of grooves.

In an embodiment of the present disclosure, at least one dimension of the groove gradually increases in the direction.

In an embodiment of the present disclosure, a number of the grooves in the protective film gradually increases in the direction.

In an embodiment of the present disclosure, the display units are arranged in an array, and wherein the positions of the grooves correspond to regions located between the display units.

In an embodiment of the present disclosure, a shape of the groove includes a rectangle, a circle, or a diamond.

In an embodiment of the present disclosure, a material of the protective film includes polyethylene terephthalate.

In an embodiment of the present disclosure, the protective film is formed to be located on a side of the flexible substrate where the display units are not formed.

Adaptive and further aspects and scope will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

As used herein and in the appended claims, the singular form of a word includes the plural, and vice versa, unless the context clearly dictates otherwise. Thus, the references "a", "an", and "the" are generally inclusive of the plurals of the respective terms. Similarly, the words "comprise", "comprises", and "comprising" are to be interpreted inclusively rather than exclusively. Likewise, the terms "include", "including" and "or" should all be construed to be inclusive, unless such a construction is clearly prohibited from the context. The term "example" used herein, particularly when followed by a listing of terms, is merely exemplary and illustrative and should not be deemed to be exclusive or comprehensive.

Additionally, further to be noted, when the elements and the embodiments thereof of the present disclosure are introduced, the articles "a/an", "one", "the" and "said" are intended to represent the existence of one or more elements. Unless otherwise specified, "a plurality of" means two or more. The expressions "comprise", "include", "contain" and "have" are intended as inclusive and mean that there may be other elements besides those listed. The terms such as "first" and "second" are used herein only for purposes of description and are not intended to indicate or imply relative importance and the order of formation.

Exemplary embodiments will now be described more fully with reference to the accompanying drawings.

Figure 1:
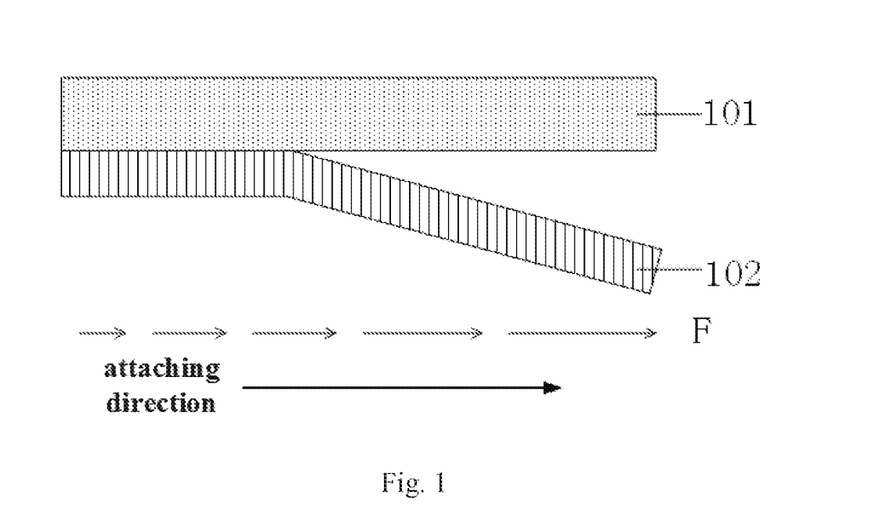
FIG. 1 illustrates a schematic cross-sectional view of a flexible display panel.

At present, in a flexible display panel, a protective film is required to protect a flexible substrate. However, as shown in FIG. 1, a stress F generates during a process of attaching a protective film 102 to a surface of a flexible substrate 101. As the attaching process proceeds, the stress F is increasingly stronger in the attaching direction. Thus, the flexible substrate 101 is warped and display units (not shown) formed on the flexible substrate 101 are warped.

Figure 2:
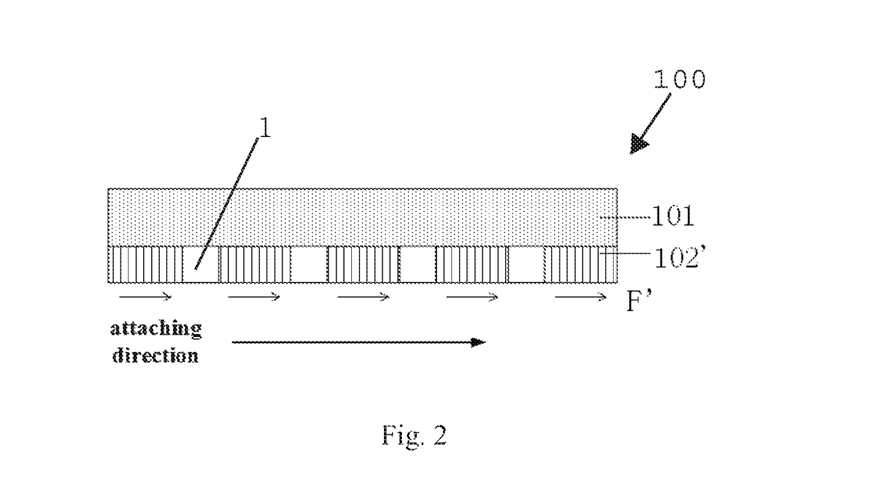
FIG. 2 illustrates a schematic cross-sectional view of a flexible display panel in accordance with an embodiment of the present disclosure.

In an embodiment of the present disclosure, a flexible display panel is provided. The flexible display panel includes a flexible substrate and a protective film located on the flexible substrate. The protective film includes a plurality of grooves spaced apart from each other. FIG. 2 illustrates a schematic cross-sectional view of a flexible display panel in accordance with an embodiment of the present disclosure. As shown in FIG. 2, a flexible display panel 100 includes a flexible substrate 101 and a protective film 102' located on the flexible substrate 101. The protective film 102' includes a plurality of grooves 1 spaced apart from each other, so as to be capable of partially releasing a stress F' generated in a direction (for example, an attaching direction as shown in FIG. 2) during a process of attaching the protective film 102', and to keep the stress F' at a low level during the attaching process. In an embodiment of the present disclosure, the direction, for example, the attaching direction as shown in FIG. 2, extends from a first side of the flexible substrate 101 to a second side of the flexible substrate 101 opposite to the first side.

FIGS. 3 to 6 illustrate schematic plan views of a protective film in accordance with an embodiment of the present disclosure.

Figure 3:
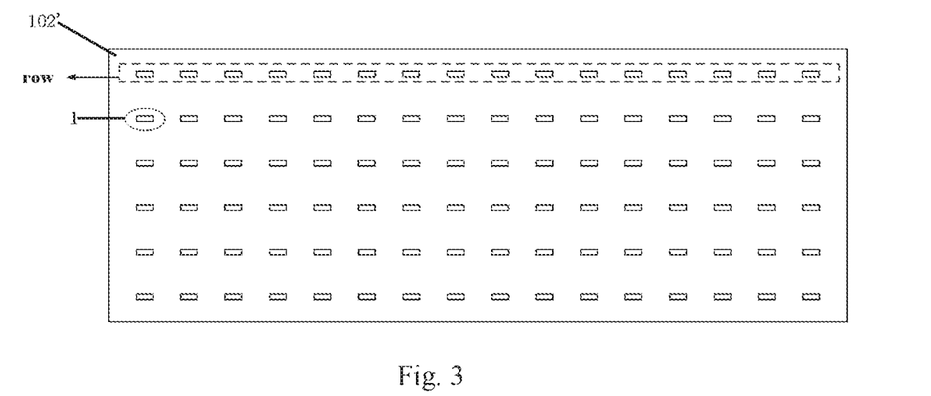
FIG. 3 illustrates a plan view of a protective film in accordance with an embodiment of the present disclosure.

In an exemplary embodiment of the present disclosure, as shown in FIG. 3, the protective film 102' includes the plurality of grooves 1 spaced apart from each other. In FIG. 3, the plurality of grooves 1 include at least one row of grooves 1. In an exemplary embodiment of the present disclosure, a direction of the row is parallel to the attaching direction.

Figure 4:
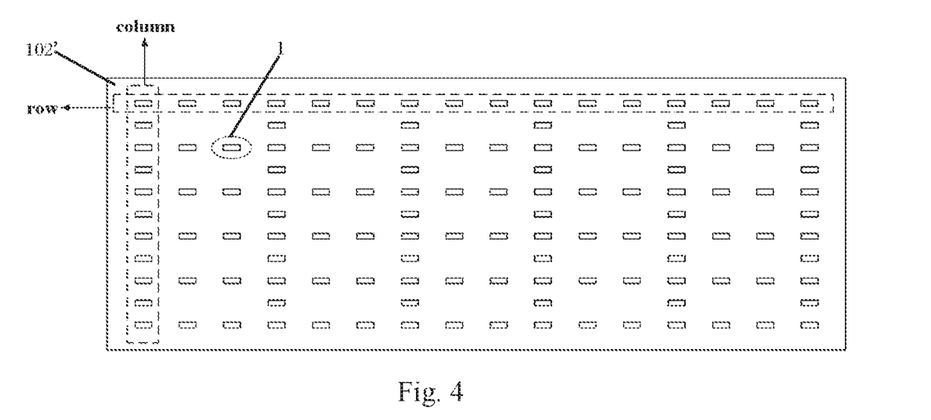
FIG. 4 illustrates a plan view of a protective film in accordance with an embodiment of the present disclosure.

In an exemplary embodiment of the present disclosure, as shown in FIG. 4, the protective film 102' further includes at least one column of grooves 1 intersecting the at least one row of grooves 1, thus the stress in the protective film can be more effectively released.

Figure 5:
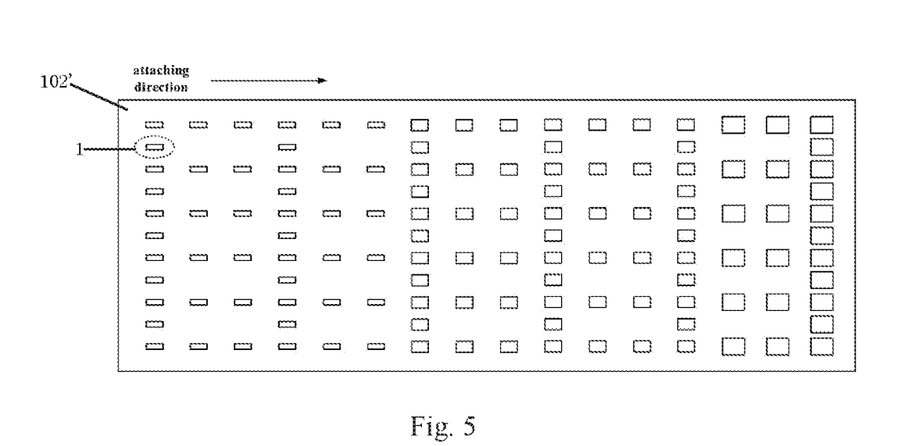
FIG. 5 illustrates a plan view of a protective film in accordance with an embodiment of the present disclosure.

In an exemplary embodiment of the present disclosure, as shown in FIG. 5, at least one dimension of the groove 1 in the protective film 102' (for example, a dimension in a direction perpendicular to the attaching direction) gradually increases in the attaching direction. It should be understood that, as described above, as the attaching process of the protective film proceeds, the stress becomes increasingly stronger in the attaching direction. Therefore, the at least one dimension of the groove in the protective film being set to gradually increase in the attaching direction further contributes to release the stress sufficiently.

Figure 6:
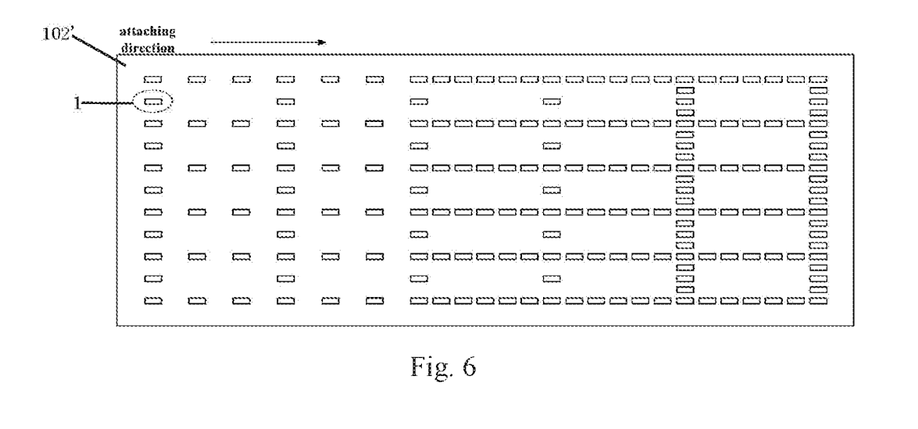
FIG. 6 illustrates a plan view of a protective film in accordance with an embodiment of the present disclosure.

In the exemplary embodiment of the present disclosure, as shown in FIG. 6, a number of the grooves 1 in the protective film 102' gradually increases in the attaching direction. It should be understood that, as described above, as the attaching process of the protective film proceeds, the stress becomes increasingly stronger in the attaching direction. Therefore, the number of the grooves in the protective film being set to gradually increase in the attaching direction also contributes to release the stress sufficiently.

Figure 7:
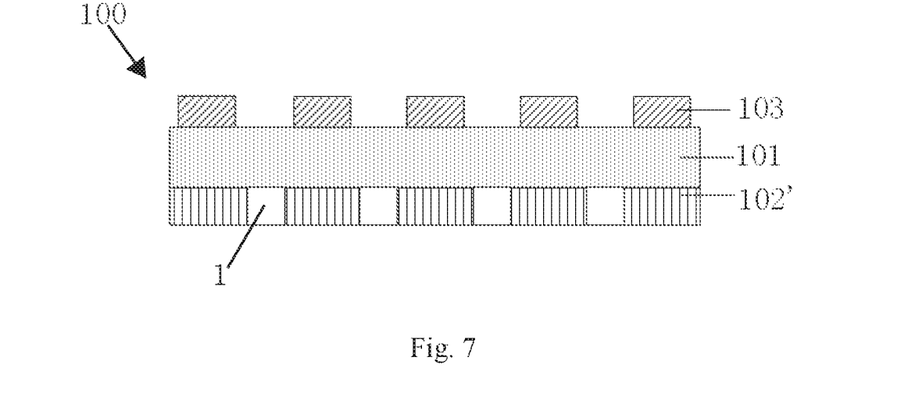
FIG. 7 illustrates a schematic cross-sectional view of a flexible display panel in accordance with an embodiment of the present disclosure.

In an embodiment of the present disclosure, positions of the grooves correspond to regions of the flexible substrate where the display units are not formed. FIG. 7 illustrates a schematic cross-sectional view of a flexible display panel in accordance with an embodiment of the present disclosure.

As shown in FIG. 7, positions of the grooves 1 correspond to regions of the flexible substrate 101 where the display units 103 are not formed. That is, orthographic projections of the grooves 1 on the flexible substrate 101 do not overlap with orthographic projections of the display units 103 on the flexible substrate 101. Therefore, the grooves 1 do not affect the protection by the protective film 102' to a portion of the flexible substrate 101 where the display units 103 are formed.

Figure 8:
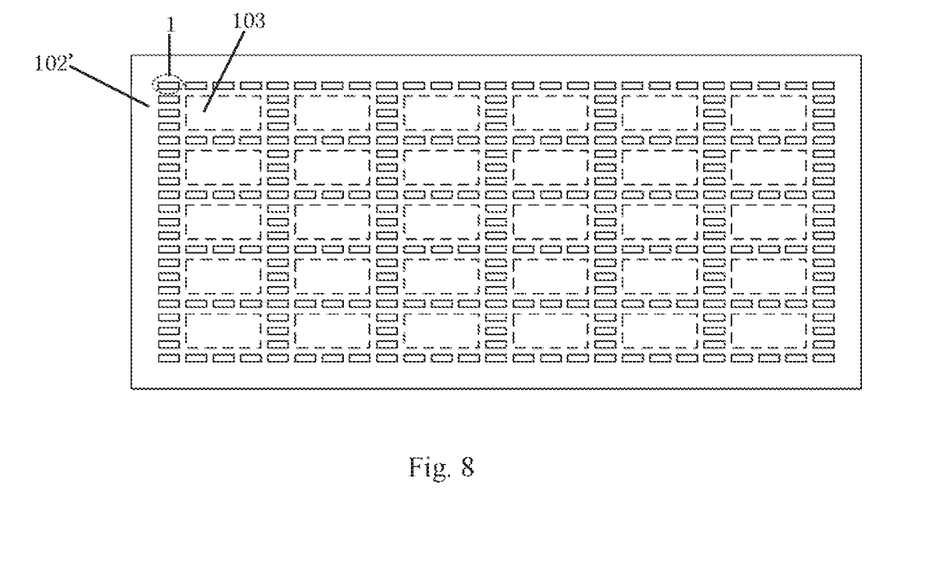
FIG. 8 is a plan view schematically illustrating a positional relationship between grooves in a protective film and display units in accordance with an embodiment of the present disclosure in the configuration shown in FIG. 7.

FIG. 8 is a plan view schematically illustrating a positional relationship between grooves in a protective film and display units in accordance with an embodiment of the present disclosure in the configuration shown in FIG. 7. In an exemplary embodiment of the present disclosure, as shown in FIG. 8, the display units 103 (shown as a broken line block in the drawing) are arranged in an array. As an example, the positions of the grooves 1 may correspond to regions located between adjacent display units 103. That is, the grooves 1 are located within cutting regions for separating the display units 103. With such a configuration, the grooves 1 do not deteriorate the protective effect of the protective film 102' on the flexible substrate 101 thus separated. Here, the grooves 1 can release the stress generated during the attaching process of the protective film 102', thereby preventing the display units 103 formed on the flexible substrate 101 from being warped due to stress accumulation.

In an exemplary embodiment of the present disclosure, a shape of the groove 1 includes a rectangle, a circle, or a diamond. It is to be noted that the drawings show only one specific embodiment of the shape of the groove 1, which cannot be construed as a limit to the disclosure.

In an exemplary embodiment of the present disclosure, a material of the protective film may include polyethylene terephthalate.

In an exemplary embodiment of the present disclosure, a method for forming grooves in the protective film may include stamping or laser cutting.

Further, in an embodiment of the present disclosure, a bonding layer (not shown) may be further disposed between the protective film and the flexible substrate for attaching the protective film to the flexible substrate, thereby protecting the flexible substrates. As an example, a material of the bonding layer may include an acrylic glue.

In an exemplary embodiment of the present disclosure, the thickness of the protective film may range from about 30 µm to 200 µm. As an example, the thickness of the protective film is 100 µm.

It should be noted that the protective film in accordance with an embodiment of the present disclosure may be attached after the display units are formed on the flexible substrate.

In an embodiment of the present disclosure, the protective film is located on a side of the flexible substrate where the display units are not formed. As shown in FIG. 7, the protective film 102' is formed on a side of the flexible substrate 101 where the display units 103 are not formed. The protective film is capable of releasing the stress generated during the attachment process of the protective film, thereby preventing the display units in the display panel from being warped.

In an embodiment of the present disclosure, a method for manufacturing a flexible display panel is provided. The method will be described with reference to FIG. 2.

In an embodiment of the present disclosure, the method includes providing a flexible substrate 101, and attaching a protective film 102' to the flexible substrate 101 in a direction extending from a first side of the flexible substrate 101 to a second side of the flexible substrate 101 opposite to the first side, for example, an attaching direction as shown in FIG. 2.

In an embodiment of the present disclosure, the protective film 102' includes a plurality of grooves 1 spaced apart from each other. In an embodiment of the present disclosure, positions of the grooves 1 correspond to regions of the flexible substrate 101 where display units are not formed. Other descriptions about the protective film are same as the embodiment described with reference to FIGS. 2-8, which will not be repeated here.

The foregoing description of the embodiment has been provided for purpose of illustration and description. It is not intended to be exhaustive or to limit the disclosure. Even if not specifically shown or described, individual elements or features of a particular embodiment are generally not limited to that particular embodiment, are interchangeable when under a suitable condition, can be used in a selected embodiment and may also be varied in many ways. Such variations are not to be regarded as a departure from the disclosure, and all such modifications are included within the scope of the disclosure.

What is claimed is:

1. A flexible display panel comprising:
   a flexible substrate; and
   a protective film located on the flexible substrate, wherein the protective film comprises a plurality of grooves spaced apart from each other, and wherein positions of the grooves correspond to regions of the flexible substrate where display units are not formed,
   wherein the plurality of grooves are disposed in a direction which is parallel to the flexible substrate and extends from a first side of the flexible substrate to a second side of the flexible substrate opposite to the first side, and
   wherein throughout the entire region going from a first edge of the protective film at the first side to a second edge of the protective film at the second side along the direction:
     each groove of the plurality of grooves has at least one dimension that is greater than or equal to the corresponding at least one dimension of a preceding groove of the plurality of grooves;
     at least one a first groove of the plurality of grooves is closer to the second edge than any other grooves of the plurality of grooves;
     at least one second groove of the plurality of grooves is closer to the first edge than any other grooves of the plurality of grooves; and
     at least one dimension of the at least one first groove of the plurality of grooves is larger than the corresponding at least one dimension of the at least one second groove of the plurality of grooves.

2. The flexible display panel according to claim 1, wherein the plurality of grooves comprise at least one row of grooves.

3. The flexible display panel according to claim 2, wherein the plurality of grooves further comprise at least one column of grooves intersecting the at least one row of grooves.

4. The flexible display panel according to claim 2, wherein a direction of the row is parallel to the direction extending from the first side of the flexible substrate to the second side of the flexible substrate opposite to the first side.

5. The flexible display panel according to claim 1, wherein the display units are arranged in an array, and wherein the positions of the grooves correspond to regions located between the display units.

6. The flexible display panel according to claim 1, wherein a shape of the grooves comprises a rectangle, a circle, or a diamond.

7. The flexible display panel according to claim 1, wherein a material of the protective film comprises polyethylene terephthalate.

8. The flexible display panel according to claim 1, wherein the protective film is located on a side of the flexible substrate where the display units are not formed.

9. The flexible display panel according to claim 1, wherein a number of the grooves in the protective film gradually increases in the direction extending from the first side of the flexible substrate to the second side of the flexible substrate opposite to the first side.

10. A method for manufacturing a flexible display panel comprising:
    providing a flexible substrate; and
    attaching a protective film to the flexible substrate in a direction which is parallel to the flexible substrate and extends from a first side of the flexible substrate to a second side of the flexible substrate opposite to the first side, wherein the protective film comprises a plurality of grooves spaced apart from each other, and wherein positions of the grooves correspond to regions of the flexible substrate where display units are not formed,
    wherein the plurality of grooves are disposed in the direction, and
    wherein throughout the entire region going from a first edge of the protective film at the first side to a second edge of the protective film at the second side along the direction:
      each groove of the plurality of grooves has at least one dimension that is greater than or equal to the corresponding at least one dimension of a preceding groove of the plurality of grooves;
      at least one a first groove of the plurality of grooves is closer to the second edge than any other grooves of the plurality of grooves;

at least one a second groove of the plurality of grooves is closer to the first edge than any other grooves of the plurality of grooves;

at least one dimension of the at least one first groove of the plurality of grooves is larger than the corresponding at least one dimension of the at least one second groove of the plurality of grooves.

11. The method according to claim 10, wherein the plurality of grooves comprise at least one row of grooves.

12. The method according to claim 11, wherein a direction of the row is parallel to the direction extending from the first side of the flexible substrate to the second side of the flexible substrate.

13. The method according to claim 12, wherein the plurality of grooves further comprise at least one column of grooves intersecting the at least one row of grooves.

14. The method according to claim 10, wherein a number of the grooves in the protective film gradually increases in the attaching direction.

15. The method according to claim 10, wherein the display units are arranged in an array, and wherein the positions of the grooves correspond to regions located between the display units.

16. The method according to claim 10, wherein a shape of the grooves comprises a rectangle, a circle, or a diamond.

17. The method according to claim 10, wherein a material of the protective film comprises polyethylene terephthalate.

18. The method according to claim 10, wherein the protective film is formed to be located on a side of the flexible substrate where the display units are not formed.

* * * * *

UNITED STATES PATENT AND TRADEMARK OFFICE
CERTIFICATE OF CORRECTION

PATENT NO. : 11,826,997 B2
APPLICATION NO. : 16/491775
DATED : November 28, 2023
INVENTOR(S) : Hao Yan et al.

It is certified that error appears in the above-identified patent and that said Letters Patent is hereby corrected as shown below:

In the Claims

In Claim 1, Column 6, Line 3, delete "at least one a first groove" and insert therefor -- at least one first groove --.
In Claim 10, Column 6, Line 65, delete "at least one a first groove" and insert therefor -- at least one first groove --.
In Claim 10, Column 7, Line 1, delete "at least one a second groove" and insert therefor -- at least one second groove --.
In Claim 10, Column 7, Line 3, delete "plurality of grooves;" and insert therefor -- plurality of grooves; and --.

Signed and Sealed this
Ninth Day of January, 2024

Katherine Kelly Vidal
*Director of the United States Patent and Trademark Office*